P. H. BARTLETT.
INDICATING AND TESTING SUPPLY SWITCH BOX.
APPLICATION FILED JAN. 23, 1915.
1,349,651.
Patented Aug. 17, 1920.
3 SHEETS—SHEET 1.
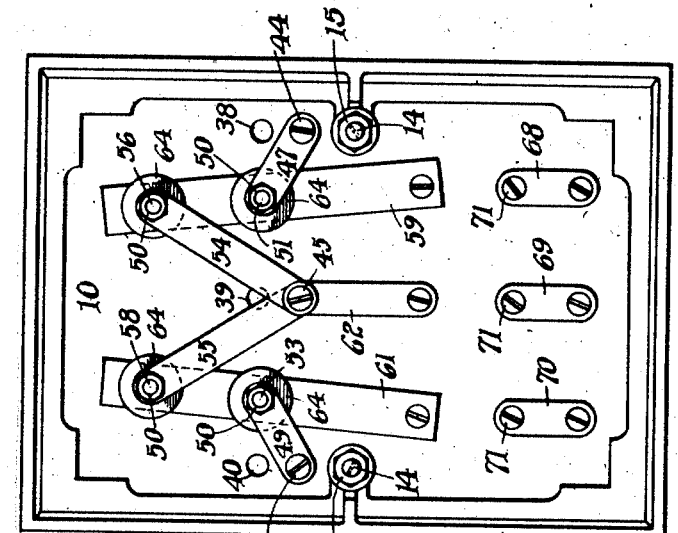
WITNESSES
Gertrude Bader.
Thos. D. Mowlds
INVENTOR
Percy H. Bartlett
BY
W. Steell Jackson
ATTORNEY

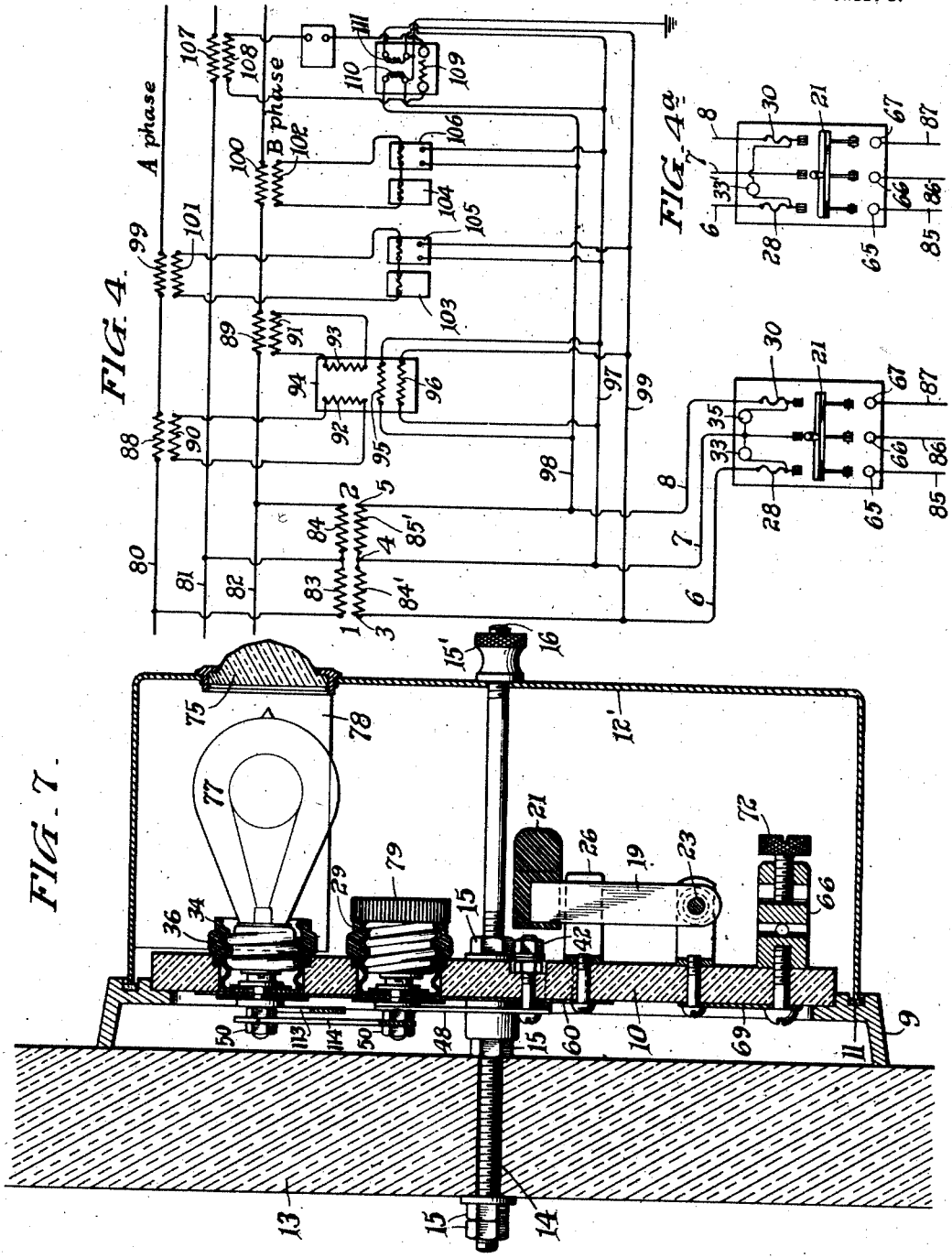

P. H. BARTLETT.
INDICATING AND TESTING SUPPLY SWITCH BOX.
APPLICATION FILED JAN. 23, 1915.
1,349,651.
Patented Aug. 17, 1920.
3 SHEETS—SHEET 3.
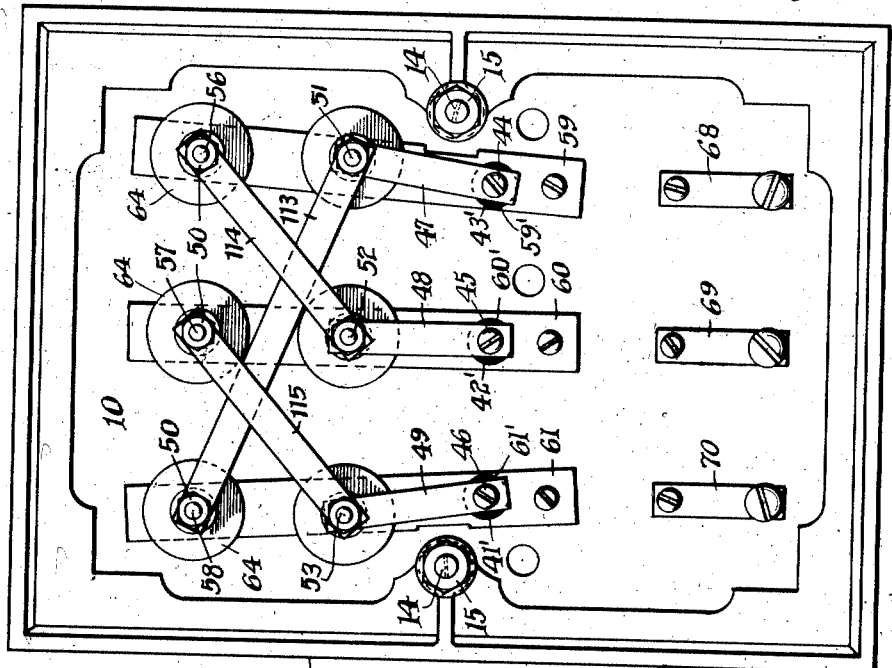
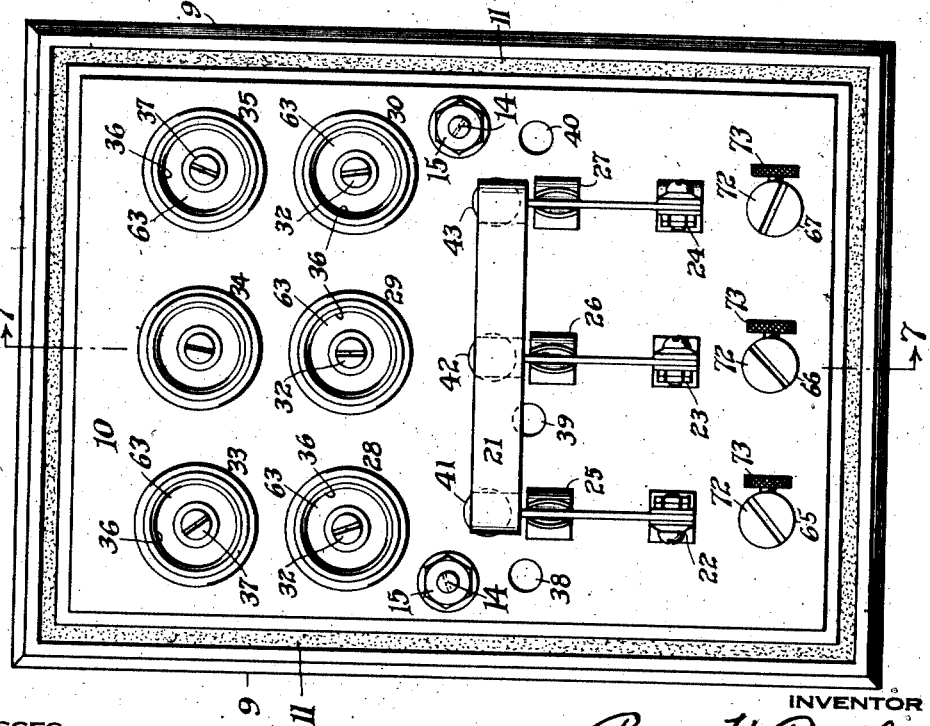
WITNESSES
INVENTOR
Percy H. Bartlett
BY
ATTORNEY

UNITED STATES PATENT OFFICE.

PERCY H. BARTLETT, OF PHILADELPHIA, PENNSYLVANIA, ASSIGNOR OF ONE-THIRD TO JOSEPH B. SEAMAN AND ONE-THIRD TO BURLEIGH CURRIER, BOTH OF PHILADELPHIA, PENNSYLVANIA.

INDICATING AND TESTING SUPPLY SWITCH-BOX.

1,349,651.     Specification of Letters Patent.     Patented Aug. 17, 1920.

Application filed January 23, 1915. Serial No. 3,906.

*To all whom it may concern:*

Be it known that I, PERCY H. BARTLETT, a citizen of the United States, residing at Philadelphia, in the county of Philadelphia and State of Pennsylvania, have invented certain new and useful Indicating and Testing Supply Switch-Boxes, of which the following is a specification.

My invention relates to instruments intended to be permanently placed upon switch boards to expedite and simplify tests made thereon and protect test devices from accidental interference as well as intentional tampering.

The purpose of my invention is to provide safe, adequate and convenient testing connections for electric installations, preferably combining the connections for related parts of the same current or allied currents in the same instrument and maintaining the same relative position for the parts in my switch as the other switch board equipment relating to corresponding parts or currents, occupies upon the board.

A further purpose of my invention is to place a pilot light or lights within a cover or covers, preferably placing the lights affected by related currents under the same cover and separating by a partition or by partitions preferably carried by the cover. I supply a separate bull's eye or opening for each light and shield each light from the bull's eye or opening of the other by the partition. The cover or covers may be locked where desired.

A further purpose of my invention is to provide a permanent test device with terminals by which instruments may be connected and to supply it with current from transformer secondaries, either specially set apart for the purpose, or protected from other uses and connections which would disturb the phase relations or electrical constants relied upon in indicating or recording the electrical energy and in making tests, protecting the switch circuits by fuses and indicating by pilot lights whether or not normal conditions prevail on the circuit.

A further purpose of my invention is to provide a test switch and connections especially suitable for the testing of instruments on either single phase or multiphase electric circuits.

Further purposes of my invention will appear in the specification and claim thereof.

I have preferred to illustrate my invention by but two forms thereof, among the many which will occur to those skilled in the art, selecting forms which are practical, efficient and relatively inexpensive and which at the same time will illustrate the principles of my invention.

Figure 1 is a top plan view of one form of my invention, certain parts being removed.

Fig. 2 is a bottom plan view of the form shown in Fig. 1.

Fig. 3 is a section taken upon line 3—3 of Fig. 1, but with other parts in place which are not shown in Fig. 1.

Fig. 4 is a diagram of the connections with which my invention may be used.

Fig. 4ª is a fragmentary diagram showing modified connections.

Fig. 5 is a top plan view, corresponding to Fig. 1 but showing my invention adapted for a current having a different number of phases.

Fig. 6 is a bottom plan view of the second form of my invention.

Fig. 7 is a section of Fig. 5 taken upon line 7—7, but with some parts added thereto.

In the drawings similar numerals indicate like parts.

Heretofore no provision has been made to supply current from an adequate and proper source for testing purposes. The practice has been to make temporary connections on the back of the switchboard to existing wiring, which generally is in close proximity to high tension busses and other primary equipment. This necessitates the tracing of the wires, the baring of the conductors by cutting away the insulation, the making of temporary connections and the running of temporary wires to the front of the board. It is evident that this requires considerable time, (particularly as the same operations have to be repeated each time a test is made,) disarranges the wiring, introduces the possibility of errors due to wrong connections, and is accompanied by the danger of personal injury which might be serious.

Short-circuits, the tripping of oil switches and circuit breakers, interference with the proper operation of regulators and other equipment frequently occur due to wrong connections and errors made when connecting for testing. In many cases, such errors result in the entire shutting down of the station generators, or the improper throwing in or out of commission of feeders, circuits and apparatus, all of which are serious considerations in the proper and safe operation of a central station. By the use of my special supply switch and sockets, forming a test box, the labor is reduced to a minimum, and all objectionable features of the old methods are eliminated. The work can be done with safety and the possible inaccuracies due to wrong connections are done away with.

The text box pilot lights when burning up to full candle power indicate that the station instruments, such as watthour meters, power factor indicators, voltmeters, etc., are being properly supplied with normal potential and show that no inaccuracies exist from this source, which might occur due to the blowing of a primary fuse on a potential transformer or to a kindred cause. Such indications are of especial value in the case of polyphase instruments of various types, which are dependent upon voltages from more than one phase, all of the proper phase displacement.

The test box provides means for obtaining testing currents of proper phase relations so that the various types of instruments may be readily tested from the front of the board, or in juxtaposition to the meters or instruments.

Instead of the present slipshod and uncertain scattered sources of current supply, of questionable phase accuracy, dependent upon their intermediate or associated use and of indefinite and too frequently insufficient capacity and difficult or dangerous accessibility, I purpose providing transformers 1 and 2 of adequate size and having uniform phase difference between their secondary terminal leads, shown in my diagram at 3, 4 and 5. I provide these transformers as part of the initial equipment and supply permanent leads 6, 7 and 8 from them to my switch box.

The terminals and connections will, of course, differ with the number of phases, the diagram being intended for a two-phase current. In the three phase form it might be noted that the number of leads will be the same whether for star or delta connection, the neutral wire of the star connection being ordinarily disregarded.

In both of the forms of my switch shown, 9 designates an outer casing within which an insulating switch base 10 is secured. The casing is grooved upon its upper side about its perimeter to receive a cushion 11 upon which the lower edge of a cover 12 rests and by which the device is sealed against dust and moisture.

The entire switch is mounted upon any appropriate support, here shown as a switch board or slab 13 by means of threaded rods 14 which extend rearwardly or downwardly from the back of the base for this purpose and are secured by any suitable nuts 15. The rods extend also forwardly or upwardly from the face of the base for the retention of the cover. Corresponding nuts 15 are provided to secure the rods within the base and knurled nuts 15' are supplied to engage the outer surface of the cover.

The rods are transversely drilled at 16 to receive the wires of any lock or seal to prevent tampering with the connections within.

In the forms shown the invention is applied to two phase and three phase circuits, respectively. The application to different phase numbers will be apparent from the discussion of these two examples.

The structure shown comprises generally connections for the transformer secondaries; fuse plugs in series with the respective legs of the circuit; switches whereby these legs may be opened; terminals for the respective legs through which test apparatus may be connected; and pilot lights thrown across between the legs of the circuits to indicate the operation or interruption of the several phases making up the circuit: forming a concrete unitary structure of great utility and convenience.

Taking up the first form of my invention: The switch base carries a triple-knife switch 17 having blades 18, 19 and 20 and insulating handle 21, the blades being hinged at 22, 23 and 24 and engaging contacts 25, 26 and 27 when in closed position; fuse receptacles 28 and 30 having shell contacts 31 and interior contacts 32; and pilot light sockets 33 and 35 having shell contacts 36 and interior contacts 37. Other forms of switch and contacts could obviously be used.

The leads from the transformer secondaries enter from the back of the base through openings 38, 39 and 40 and are connected at the front of the base to binding posts 41, 42 and 43, two of which, one in each phase, are in electrical contact with one contact each of the fuse receptacles, through the interior contacts 32 by means of screws 44 and 46 and conductor strips 47 and 49. The strips are secured to the contacts by nuts 50 engaging threaded stems 51 and 53 upon the contacts.

The screw 45 of the third binding post is connected to one of the contacts of each of the sockets 33 and 35 by strips 54 and 55. I have shown the strips as connected with the interior contact in each case by means of stems 56 and 58 and nuts 50.

The shell contacts of receptacle 28 and socket 33 are shown as in electrical contact with conductor strip 59 and the shell contacts of receptacle 30 and socket 35 are shown as in electrical contact with conductor strip 61 to which strips the switch contacts 25 and 27 respectively are connected. The intermediate switch contact 26 is connected electrically by screw 45 with a conductor strip 62.

The insulation of the receptacles and sockets between the interior and shell contacts respectively consists of mica disks 63 and 64 pressed on opposite sides of the shell ends and strip 59 or 61 by washers 63 spanning the openings in the shell and strip and are held tight by nuts 50.

The hinges 22, 23 and 24 are connected to terminals 65, 66 and 67 by conductor strips 68, 69 and 70 and screws 71. Each of the terminals has two separable connecting devices secured by screws 72 and 73 respectively.

The cover 12 carries faceted, translucent lenses or bulls eyes 74 and 76, for the lamps 77 and a partition 78 fitting between them and shutting off the light of each from the lens of the other. Other arrangements, as for example, apertures for the lights could be provided and the lights could project through the apertures if desired.

The lamps, as also fuse plugs 79 and cover 12 are omitted from Fig. 1 for clearness.

It will be evident that each leg of the circuit is protected by a fuse in series with it, shown as located between the lead and the switch, and that the pilot lights are located across between the neutral lead and the respective legs of the circuit.

One means of reducing the number of pilot lights required though with some loss in advantage, is shown in Fig. 4ᵃ where one light 33 is thrown across between the outside wires. In case either of the sides of the circuit is in trouble the fact will be shown by this light but the side upon which the trouble occurs will not be indicated. The connections with which this construction is intended to be used are shown in Fig. 4.

One use for my invention is seen in the diagram of circuits in Fig. 4. Here the primary wires 80, 81 and 82 supply the primary windings 83 and 84 of transformers 1 and 2, from whose secondary terminals 3, 4 and 5 the leads 6, 7 and 8 extend to one of my switches. The test instrument circuits are shown as starting at 85, 86 and 87.

I have shown in my diagram a set of instruments such as is quite ordinarily mounted upon a power switchboard handling multiphase circuits, including in the set a polyphase watt meter, an ammeter for each of the sides of the circuit, an indicating watt meter for each of the sides of the circuit and a power factor indicator.

The four coils of the polyphase watt meter 94 are supplied, as usual, with current from transformers whose primaries are located in the two sides and across from each of the two sides to the neutral, respectively. The transformers located in the two sides are here 88 and 89, from whose secondaries 90 and 91 coils 92 and 93 receive their supply. In the case of meter coils 95 and 96 of the watt meter 94, I connect with the secondaries 85' and 84' to which my switch box is connected, and to the neutral 7, making the connections by wires 98, 98' and 97.

The ammeters and indicating watt meters both, as usual, receive current from transformers whose primaries 99 and 100 are located in the respective sides of the polyphase circuit. The secondary 101 is connected with the coil of the ammeter 103 and with one of the coils of the indicating watt meter 105 in series, as usual, and the secondary 102 is connected with the coil of the ammeter 104 and with one of the coils of the indicating watt meter 106 in series. The other coils of the indicating watt meters 105 and 106 are connected to secondaries whose primaries extend from the neutral wire to the respective sides of the circuit as usual, and I utilize the same secondary transformer coils which supply my switch, securing uniformity with the connections for my switch and for coils 95 and 96. The second coils each of the indicating watt meters are therefore connected with the neutral 97 each and with the respective wires 98 and 98'.

The power factor indicator, as usual, has one coil supplied by a primary within the neutral wire 81, this primary 107 having a secondary 108 connected with the terminals of the coil 109. The other two coils of this indicator are grounded at one end each and have the other terminals connected, as usual, to secondaries whose primaries lie between the neutral and the respective sides of the circuit. Here again, I have connected the ends of these two coils 110 and 111 which are not grounded to the wires 98 and 98', respectively, so as to supply them uniformly not only with the other instruments, but also with the supply for my switch box. The neutral wire 97 is grounded.

I thus furnish a potential supply of uniform phase and voltage for all of these instruments and for my switch box, insure proper transformer capacity for all and avoid danger of variation due to piecemeal transformer equipment.

I am further enabled to select primaries 83 and 84 and secondaries 84' and 85' adapted for the particular size of pilot lamps which I wish to use and the rest of the apparatus in the circuit. My box makes it difficult to make a change in any part of the circuit. I treat other switch board combinations similarly.

The use of a pilot lamp of different wattage consumption varies the accuracy of meters and instruments in the same circuit considerably, sometimes introducing an error of several per cent.

In making a test the test instruments are introduced in the circuit shown at 85, 86 and 87, giving potential readings comparable with the readings of other instruments in the circuit, as in previous tests, but with advantages in speed, ease and accuracy of connection and with the elimination of a number of previously fruitful sources of uncertainty, danger and error.

By providing fixed switch board test terminals for testing, I insure connections necessary in accurately testing the apparatus used and avoid the difficulty and in some cases impossibility of finding adequate test points in the wiring and circuits and also the difficulty and danger of tracing them, determining whether or not the best to be found are suitable and the running of temporary connections through the connections already made. In switch boards whose sides have been inclosed by screening locked in place to avoid the danger of tampering, I avoid an opportunity for possible connivance between the test operator and the employees for tampering with the wiring, which would be provided if it were necessary to unlock these screens.

In the form shown in Figs. 5, 6 and 7, the same arrangements are shown except in so far as additional construction is required for the additional fuse receptacle 29 in series with the middle switch and the additional lamp socket 34 forming the third lamp socket utilized for the three phase arrangement.

For convenience, the binding posts 41, 42 and 43 are located directly in front of the strips 59, 60 and 61, necessitating the aperturing of these strips at 59', 60', 61' and insulation 41', 42', 43' for the binding posts where they pass through the apertures to connect with the strips 47, 48 and 49. The fuse receptacles and lamp sockets for the outer connections are in the same locations with respect to the strips 59 and 61 as in the first form, and the receptacle and socket for the strip 60 are similarly located with respect to the strip 60 and similarly insulated.

The connections between the interior contacts of the fuse receptacles 28, 29 and 30 are differently run because of the triple form required and comprise strips located in different levels or planes, i. e., at different distances from the switch base. One of these strips 113 connects the stem 51 of fuse receptacle 28 with the stem 58 of lamp socket 35. The stems 52 and 53 as well as the stems 56 and 57 have been extended and spacing means, here nuts 50, used to support the strips 114 and 115 far enough away from the base so that they pass over the strip 113 without touching it, meanwhile connecting the inner contact of fuse receptacle 29 with the inner contact of lamp socket 33 and the inner contact of fuse receptacle 30 with the inner contact of lamp socket 34.

As will be seen one of the fuses is interposed between each of the binding posts 41, 42 and 43 and the corresponding or adjacent plate 59, 60, 61 or switch terminals 25, 26 and 27 and one of the pilot lights is connected between each pair of conductors representing the phases for the three-phase circuit.

The cover 12' of my second form is provided with three lenses, of which 75 only is shown, and with two partitions 78 spacing between them.

It will be evident that parts of my invention may be utilized without the use of all of it; that it may be used in other relations than those shown; and that other constructions may be utilized for carrying my invention out with part of the advantage at least resulting from the construction shown; without departing from the spirit and scope of my claim.

Having thus described my invention, what I claim as new and desire to secure by Letters Patent is:—

In a device of the character stated, a base, two pilot lights thereon, a circuit having two phases across which the two lights are respectively connected, a cover protecting from unauthorized interference with the lights and means for distinguishing at a distance between the lights when one is lighted and the other is not.

PERCY H. BARTLETT.

Witnesses:
  WM. STEELL JACKSON,
  J. LUTHERIA KAUFFMAN.